United States Patent
Marriott et al.

(10) Patent No.: US 8,005,595 B2
(45) Date of Patent: Aug. 23, 2011

(54) OCCUPANT MONITORING AND RESTRAINT STATUS SYSTEM

(75) Inventors: Brandon Scott Marriott, Waterford, MI (US); Gary Stroik, Swartz Creek, MI (US); Russ Carlton, Oxford, MI (US); Thomas Wayne Messner, Grand Blanc, MI (US)

(73) Assignee: TK Holdings Inc., Auburn Hills, MI (US)

( * ) Notice: Subject to any disclaimer, the term of this patent is extended or adjusted under 35 U.S.C. 154(b) by 461 days.

(21) Appl. No.: 12/292,476

(22) Filed: Nov. 19, 2008

(65) Prior Publication Data

US 2009/0132128 A1  May 21, 2009

Related U.S. Application Data

(60) Provisional application No. 60/996,487, filed on Nov. 20, 2007.

(51) Int. Cl.
*B60R 22/48* (2006.01)

(52) U.S. Cl. ...... 701/45; 180/268; 180/271; 280/801.1; 340/433; 340/457.1

(58) Field of Classification Search .......... 180/268, 180/271; 280/801.1; 340/433, 457.1; 701/45
See application file for complete search history.

(56) References Cited

U.S. PATENT DOCUMENTS

| | | | |
|---|---|---|---|
| 6,204,757 B1 * | 3/2001 | Evans et al. ........... 340/439 |
| 6,215,395 B1 * | 4/2001 | Slaughter et al. ...... 340/457.1 |
| 6,362,734 B1 * | 3/2002 | McQuade et al. ....... 340/457.1 |
| 6,448,907 B1 * | 9/2002 | Naclerio ................ 340/945 |
| 6,556,903 B2 * | 4/2003 | Chinigo et al. .......... 701/29 |
| 6,888,475 B2 * | 5/2005 | Darr ..................... 340/945 |
| 7,002,477 B1 * | 2/2006 | Camhi ................... 340/573.1 |
| 7,262,696 B2 * | 8/2007 | Aota et al. .............. 340/539.11 |
| 7,383,911 B2 * | 6/2008 | Schondorf et al. ........ 180/268 |
| 7,511,610 B2 * | 3/2009 | Downey et al. ......... 340/457.1 |
| 7,916,008 B2 * | 3/2011 | Nathan et al. ........... 340/438 |
| 2004/0124974 A1 * | 7/2004 | Ota et al. ............... 340/457.1 |
| 2005/0038586 A1 * | 2/2005 | Griffin et al. ........... 701/45 |
| 2005/0080533 A1 * | 4/2005 | Basir et al. ............. 701/45 |
| 2006/0017564 A1 * | 1/2006 | Phillips ................. 340/539.13 |
| 2006/0022796 A1 * | 2/2006 | Striemer ................ 340/7.2 |
| 2006/0071769 A1 * | 4/2006 | Ide et al. ............... 340/457.1 |
| 2007/0085669 A1 * | 4/2007 | Becker et al. .......... 340/457.1 |
| 2007/0205884 A1 * | 9/2007 | Federspiel et al. ...... 340/457.1 |
| 2008/0297341 A1 * | 12/2008 | McClanahan ........... 340/539.13 |

* cited by examiner

*Primary Examiner* — Ruth Ilan
(74) *Attorney, Agent, or Firm* — Foley and Lardner LLP

(57) ABSTRACT

An occupant monitoring and restraint status system is provided. The system includes an occupant boarding and de-boarding system. The occupant boarding and de-boarding system detects boarding and de-boarding of occupants. The system also includes a bench type seat that has a plurality of seat locations. Each of these seat locations includes a seat belt system which has a status sensor to detect a state of the seat belt system. Each seat location also includes an occupant sensing system. The occupant sensing system detects the presence and identity of an occupant at the seat location. The system further includes a display which includes a seat status indicator for each of the plurality of seat locations. The seat status indicators include information regarding a presence of an occupant, an occupant identity, and a state of a seat belt system.

20 Claims, 7 Drawing Sheets

OCCUPANT MONITORING AND RESTRAINT STATUS SYSTEM

CROSS REFERENCE TO RELATED APPLICATION

The present application claims the benefit of and priority to U.S. Provisional Patent Application No. 60/996,487, filed Nov. 20, 2007. The foregoing provisional application is incorporated by reference herein in its entirety.

BACKGROUND

The present invention relates generally to the field of occupant vehicles. More specifically, the present invention relates generally to occupant monitoring and restraint status systems employed in occupant vehicles, such as busses.

Currently, there are no available systems designed to assist the driver of a vehicle with enforcing usage of seat belts and to communicate other valuable occupant information to the driver. Drivers of larger occupant vehicles such as buses may only be able to use mirrors and turn their head to look back in order to check on the occupants.

What is needed is a occupant monitoring and restraint status system that visually and simply communicates information to the driver of a vehicle including the occupancy of seats, and whether the occupants in occupied seats are using their seat belts properly. Further, such a system would be capable of determining the location of particular occupants of a vehicle, whether the particular occupant is seated in a seating location, and whether the particular occupant who is seated at a particular seating location is properly wearing their seatbelt.

SUMMARY

According to one disclosed embodiment, an occupant monitoring and restraint status system includes an occupant boarding and de-boarding system to detect the boarding and de-boarding of occupants. The system also includes a bench type seat that includes seat locations. Each of the seat locations includes a seat belt system with a status sensor and an occupant sensing system. The status sensor detects a state of the seat belt system. The occupant sensing system detects the presence of an occupant and an identity of an occupant. The system further includes a display that includes a seat status indicator for each of the seat locations. The seat status indicator includes information regarding a presence of an occupant, an occupant identity, and a state of a seat belt system.

According to another disclosed embodiment, an occupant monitoring and restraint status system includes an occupant boarding and de-boarding system to detect the boarding and de-boarding of occupants. The system also includes a bench type seat that includes seat locations. Each of the seat locations includes a seat belt system with a status sensor and an occupant sensing system. The status sensor detects a state of the seat belt system. The occupant sensing system detects the presence of an occupant and an identity of an occupant. The system further includes a display that includes a seat status indicator for each of the seat locations. The seat status indicator includes information regarding a presence of an occupant, an occupant identity, and a state of a seat belt system. The system also includes a controller. The controller processes output from the occupant boarding and de-boarding system, the status sensor of the seat belt system of each seat location, and the occupant sensing system of each seat location. The controller also determines the location of occupants within a vehicle, whether an occupant is seated in a one of the plurality of seat locations, and whether a seat belt system of a one of the plurality of seat locations where an occupant is seated is properly engaged. The controller further controls the display.

It is to be understood that both the foregoing general description and the following detailed description are exemplary and explanatory only, and are not restrictive of the invention as claimed. These and other features, aspects and advantages of the present invention will become apparent from the following description, appended claims, and the accompanying exemplary embodiments shown in the drawings, which are briefly described below.

BRIEF DESCRIPTION

DETAILED DESCRIPTION

Embodiments of the present invention will be described below with reference to the accompanying drawings. It should be understood that the following description is intended to describe exemplary embodiments of the invention, and not to limit the invention. According to various exemplary embodiments, the occupant monitoring and restraint status system may be implemented on various types of vehicles. The present disclosure offers a bus as an example of a vehicle where the system may be implemented.

Figure 7:
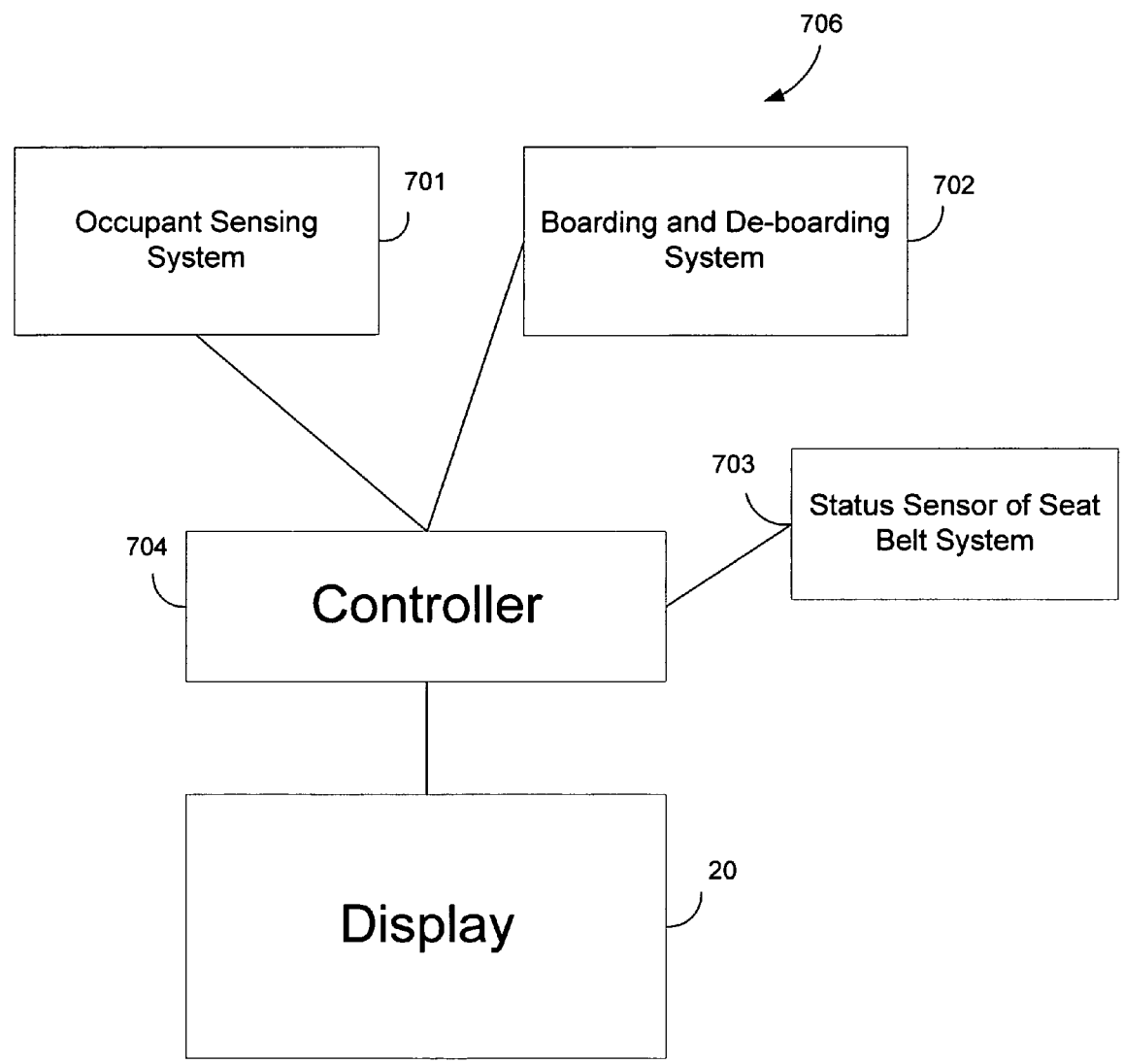
FIG. 7 is a block diagram of an occupant monitoring and restraint status system, according to one embodiment.

FIG. 7 is a block diagram of an occupant monitoring and restraint status system 706, according to one embodiment. The occupant monitoring and restraint status system 706 includes an occupant boarding and de-boarding system 702 to detect the boarding and de-boarding of occupants. The system also includes a bench type seat that includes seat locations. Each of the seat locations includes a seat belt system with a status sensor 703 and an occupant sensing system 701. The status sensor 703 detects a state of the seat belt system. The occupant sensing system 701 detects the presence of an occupant and an identity of an occupant. The system further includes a display 20 that includes a seat status indicator for each of the seat locations. The seat status indicator includes information regarding a presence of an occupant, an occupant identity, and a state of a seat belt system. The system also includes a controller 704. The controller 704 processes output from the occupant boarding and de-boarding system 702, the status sensor of the seat belt system 703 of each seat location, and the occupant sensing system 701 of each seat location. The controller 704 also determines the location of occupants within a vehicle, whether an occupant is seated in a one of the plurality of seat locations, and whether a seat belt system of a one of the plurality of seat locations where an occupant is seated is properly engaged. The controller 704 further controls the display 20.

An exemplary controller may be a special purpose computing device. Such a special purpose computing device may include read only data storage (ROM) and random access data storage (RAM) as well as a microprocessor. Alternatively, an exemplary controller might include a general purpose computing device in the form of a conventional computer, including a processing unit, a system data storage, and a system bus that couples various system components including the system data storage to the processing unit. The system data storage may include read only data storage (ROM) and random access data storage (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Further, it is to be understood that the phrase "data store" refers to any number of devices capable of storage. By way of example, a data store may be a single computer having a single hard disk drive. Alternatively, a data store may be a portion of random access memory (RAM) or may be a single hard drive.

Figure 1A:
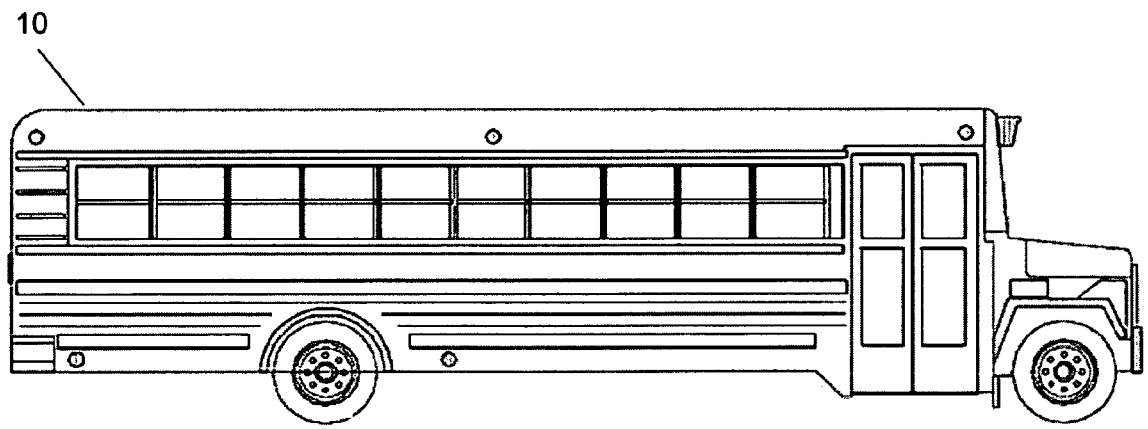
FIG. 1A is a side view of a school bus, according to one embodiment.

Referring to FIG. 1A, a side view of a bus 10 is shown, according to an exemplary embodiment. In this particular illustration, the bus 10 is a Type C bus. According to other exemplary embodiments, the bus 10 may be any other kind of school, commercial, or motor-coach bus or other occupant vehicle.

Figure 1B:
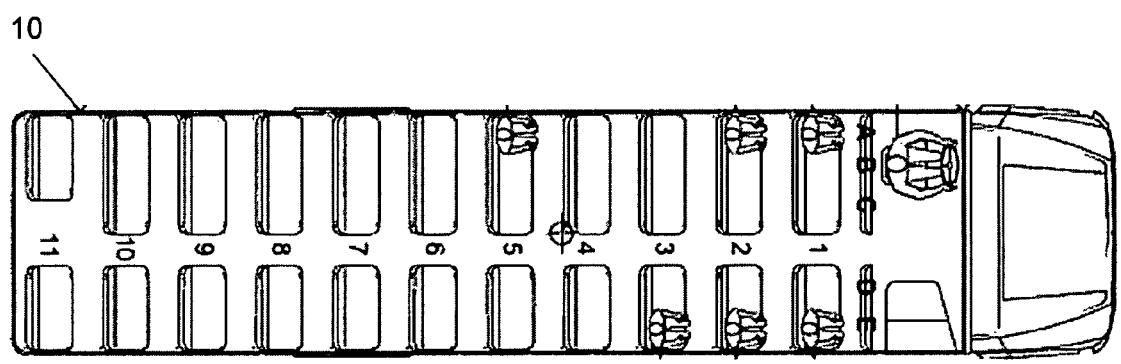
FIG. 1B is a top-down view of a school bus, according to one embodiment.

Referring to FIG. 1B, a top view of the bus 10 is shown, according to an exemplary embodiment. The bus 10 includes a plurality of bench type seats. Occupants of the bus 10 are shown in some of the seats, which are numbered according to the row the occupants sit in. The letters A through E are also used to identify possible seat locations of a occupant in a seat. The combination of the number of the row where a occupant sits and the letter corresponding to the location in the seat where the occupant sits may be used to identify which seats of the bus 10 are occupied. For example, referring to FIG. 1B, occupants are shown in seats 1A, 1E, 2A, 2E, 3E, and 5A.

Each of the seat locations includes a seat belt system. The seat belt system of each seat location includes a status sensor. The status sensor of the seat belt system is configured to detect a state of the seat belt system. Each seating location also includes an occupant sensing system. The occupant sensing system is configured to detect the presence of an occupant and the identity of the occupant. The identity of the occupant detected need not be the actual identity of the occupant (E.G. last name, first name), but rather may merely an identification code. In combination, the status sensor of the seat belt system and the occupant sensing system are capable of determining the identity of a particular occupant in a particular seat, and whether the seat belt system of the seat location in which the particular occupant is sitting is properly engaged.

In some embodiments, the boarding and de-boarding system comprises a first tripwire and a second tripwire closest to a door of the vehicle. The order in which the tripwires are crossed indicates whether an occupant is entering or exiting the vehicle. If the second tripwire closest to the door is crossed before the first tripwire furthest from the door, an occupant is entering the vehicle. If the first tripwire furthest from the door is crossed before the second tripwire closest to the door, an occupant is leaving the vehicle. In other embodiments, the occupant boarding and de-boarding system comprises a weight sensor of a higher step and a weight sensor of a lower step. Here, the order in which an occupant is sensed by the weight sensors indicates whether an occupant is entering or exiting the vehicle. If the weight sensor of the higher step senses an occupant before the weight sensor of the lower step, an occupant is leaving the vehicle. If the weight sensor of the lower step senses an occupant before the weight sensor of the higher step, an occupant is entering the vehicle.

In yet other embodiments, the occupant boarding and de-boarding system comprises a radio frequency identification reader. Such a radio frequency identification (RFID) reader is capable of reading radio frequency identification devices attached to entering and exiting occupants. If the radio frequency identification reader reads a radio frequency identification device that has previously been read, then the occupant corresponding to that radio frequency identification device is exiting the vehicle. If the radio frequency identification reader reads a radio frequency identification device that has not previously been read, then the occupant corresponding to that radio frequency identification device is entering the vehicle. In yet other embodiments, the occupant boarding and de-boarding system comprises a bar code reader to read bar codes attached to occupants. Further, in other embodiments, the occupant boarding and de-boarding system includes a sensor to sense an active wireless device attached to an occupant.

In some embodiments, the status sensor of the seat belt system of each seat location include a seat belt webbing payout sensor. Such sensors measure the payout of seat belt webbing to determine if a seat belt is currently and/or properly buckled. Seat belt payout may be measured by spool rotation and spool thickness, for example. In particular, such payout sensors may be capable of determining that the upper torso portion of a belt is improperly placed behind an occupant. In some embodiments, the status sensor of the seat belt system of each seat location include a radio frequency identification (RFID) masking payout sensor. These status sensors comprise a radio frequency identification device that is masked out when the seat belt webbing is sufficiently extended. In some embodiments, the status sensor of the seat belt system of each seat location include inductive capacitance sensors to determine if a seat belt is currently and/or properly buckled. In yet other embodiments, the status sensor of the seat belt system of each seat location include radio frequency identification (RFID) sensors to determine if a seat belt is currently and/or properly buckled. In yet other embodiments, the status sensor of the seat belt system of each seat location include switches to determine if a seat belt is currently and/or properly buckled.

In some embodiments, the occupant sensing system includes a presence sensor within the bench type seat that is a membrane-type pressure switch. In other embodiments, the occupant sensing system includes a presence sensor within the bench type seat that is a strain gauge-type displacement measurement sensor. In yet other embodiments, the occupant sensing system includes a presence sensor that is a magnetic field sensor. In even further embodiments, the occupant sensing system includes an identification sensor to identify an occupant. One embodiment of an identification sensor is a sensor to sense an active wireless device attached to an occupant. Another identification sensor is a bar code scanner to scan a bar code attached to an occupant. Another embodiment of an identification sensor is a radio frequency identification (RFID) reader. Some embodiments of the present disclosure include various combinations of each of these types of status sensors for seat belt systems and occupant sensing systems, as well as other types of status sensors for seat belt systems and occupant sensing systems. Further, each of these systems may be comprised of individual separate components or combined components. Additionally, any of the sensors or systems described herein may include varying levels of their own computing ability separate from any controller or processor.

According to the above-described embodiments, the occupants in the bus 10 may be identified in various ways. For example, the occupants may carry an identification device (e.g., a radio frequency identification tag, or RFID tag). The identification device may identify the owner of the identification device. The identity of the occupant detected need not be the actual identity of the occupant (E.G. last name, first name), but rather may merely an identification code. The identification device could be read by the occupant sensing system to determine the identity of an occupant currently seated in a seating location. Additionally, in those embodiments configured with an occupant boarding and de-boarding system comprised of a radio frequency identification reader, the occupant boarding and de-boarding system could read the identification device upon entry and exit of an occupant into and out of the vehicle. Further, in some embodiments, the controller can determine a location of an occupant within a vehicle, whether an occupant is seated in a one of the plurality of seat locations, and whether a seat belt system of a one of the plurality of seat locations where an occupant is seated is properly engaged based on received information from each of the systems and sensors, regardless of if a occupant is not in a seat on the bus 10 at the time.

The number of occupants in the bus 10 may be found in other ways. For example, membrane-type pressure switch in the seat may be able to detect when a specific location in the seat is occupied. Also, a strain gauge-type displacement measurement in each seat may be able to detect when a specific location in the seat is occupied. The occupants in the bus 10 may also be accounted for by determining how many seat belts are in use, for buses that require the use of seat belts. Several status sensors of seat belt systems are discussed above and below. For instance, the seat belt webbing payout may have a status sensor. Measurements like spool rotation and spool thickness of the seat belt may be detected, and the system may recognize if the seat belt is properly deployed, improperly deployed, or not in use based on the measurements. A status sensor may also be coupled to the webbing to sense the presence of identification devices such as RFID tags.

Figure 2:
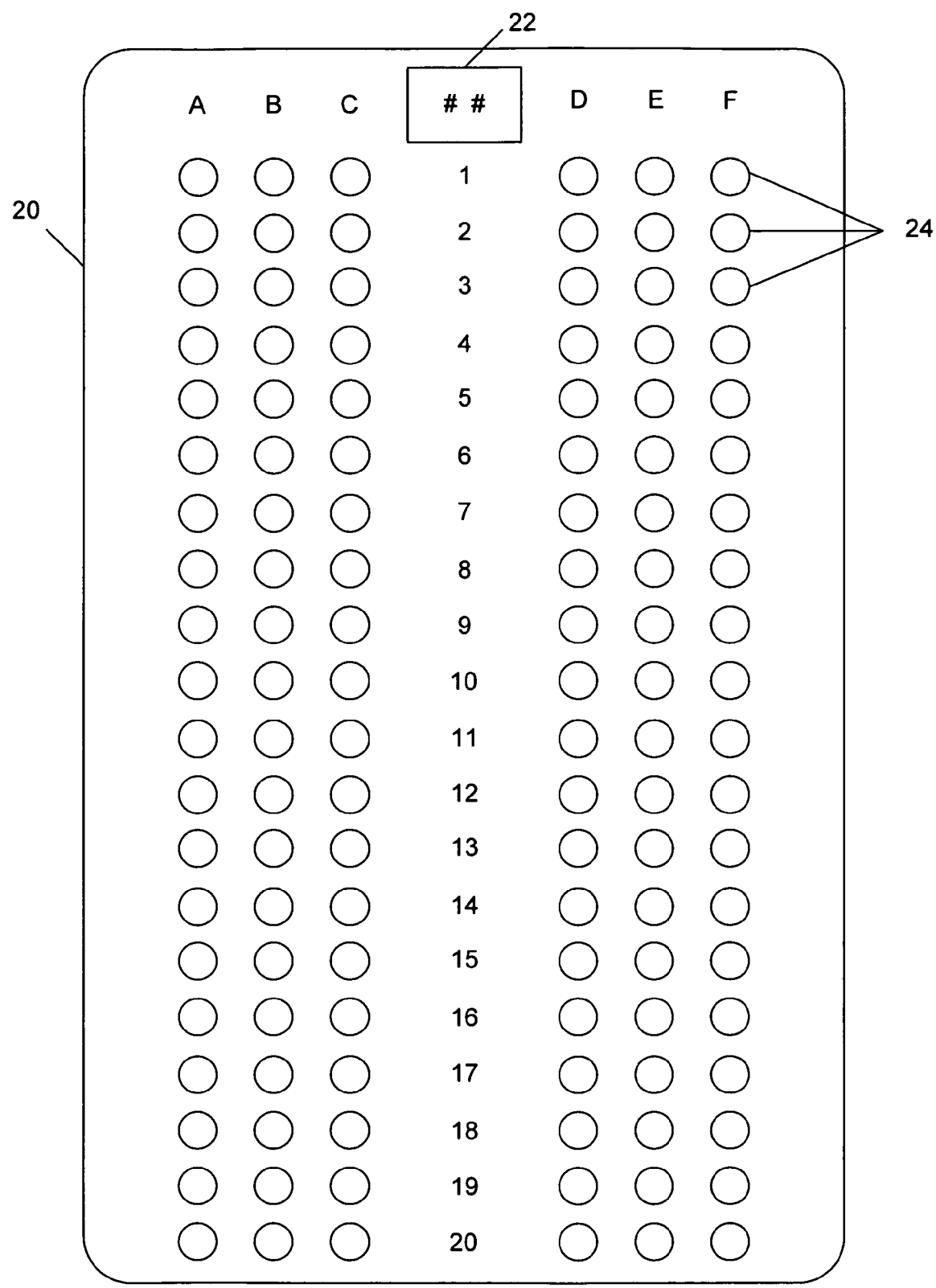
FIG. 2 is an illustration of a display, according to one embodiment.

Referring to FIG. 2, a view of a display 20 is shown, according to an exemplary embodiment. The display 20 includes a seat status indicator 24 for each of the plurality of seat locations in the bus 10. The information displayed by the display 20 is driven by information received from the status sensors of the seat belt systems as well as the occupant sensing systems of each seat location. In some embodiments, the information displayed is also driven by information received from the occupant boarding and de-boarding system. In yet other embodiments, the information displayed is controlled by the controller. In one embodiment, a seat status indicator includes information regarding a presence of an occupant, an occupant identity, and a state of a seat belt system. The driver of the vehicle may use the display 20 to check on the status of the occupants of the vehicle. The display 20 may be small enough and of varying sizes or shapes to fit in the dashboard of the vehicle, or may be attached within view of the driver in various ways (e.g., using screws or nails, using an adhesive, etc.). According to another exemplary embodiment, the display 20 may be detachable and may be carried around by the driver of the vehicle or another person. The display 20 may communicate with each of the seat belt system status sensors, and the occupant sensing systems with a wired connection or wirelessly. Similarly, the display 20 may communicate with the controller with a wired connection or wirelessly. The display 20 may be designed such that the driver may quickly identify any problems with the current status of the seats of the vehicle without straining the driver or adding a significant workload to the driver.

The display 20 may include a occupant count display section 22 that displays the number of occupants that the occupant boarding and de-boarding system has counted. The occupant count display section 22 may be located at the top of the display 20, or may be in any other location on the display 20, according to an exemplary embodiment. The occupant count display section 22 may be altered to provide other data if desired, and may be of any size or shape on the display 20.

In one embodiment, the display 20 includes numerous lights 24 as seat status indicators. The lights 24 may be a light emitting diode (LED) or any other light. Alternatively, a picture or symbol may be used. A light 24 may be provided on the display 20 for each seat location in the vehicle. For example, referring to FIG. 2, twenty rows of lights 24 are shown, indicating twenty rows of seats in a vehicle. Each seat on both aisles of the vehicle are shown as having three seat locations (A, B, C, and D, E, F). Therefore, a total of one hundred twenty seats are in the vehicle, and one hundred twenty lights 24 are shown on the display 20. According to another exemplary embodiment, there may be multiple lights representing a single seat or seat location in the vehicle, each displaying a single light or blinking pattern. In yet another embodiment, there may be a single light for multiple seat locations or seats.

In order to display the state of the various seat locations, the lights 24 may be configured to display various colors and blink at various rates. For example, a color-coded system may be used to identify the state of the various seat locations. For example, the color black may represent an unoccupied seat, the color red may represent an occupied seat where the seat belt is not being worn, the color yellow may represent an occupied seat where the seat belt is being worn improperly, and the color green may represent an occupied seat where the seat belt is being worn properly.

The colors and/or blinking pattern may be adjusted. For example, the color-coded system described above may be used for occupants whose identity is known, and a blinking pattern may be enabled for occupants whose identity is not known, while still using the color-coded system described above regarding restraint status. The colors used and blinking patterns of the light may be altered, according to various exemplary embodiments.

The display 20 may also display other information about the status of the vehicle or its occupants. The display 20 may include data about emergency doors or windows in the vehicle, or the status of any of the windows (e.g., open, open halfway, closed, etc.). The driver of the vehicle may have his or her own special display area of the display 20 that displays the current status of the driver's seat belt and/or driver. Alternatively, the display 20 may be configured to simply show what seats are occupied, regardless of restraint status.

Figure 3:
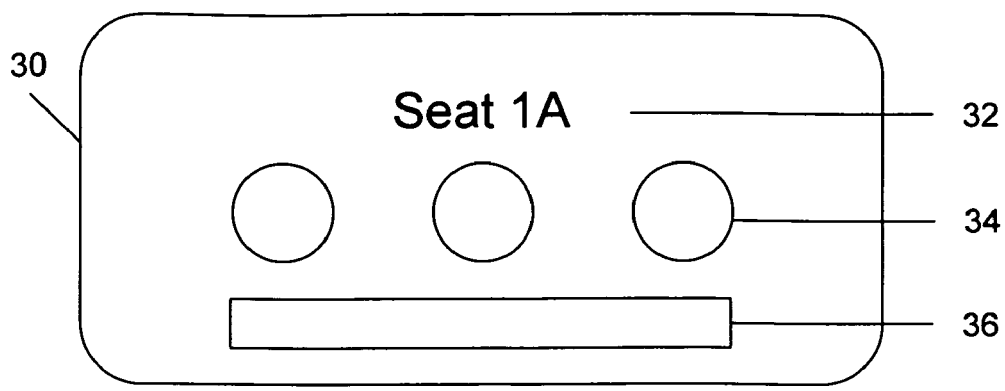
FIG. 3 is an illustration of a seat display, according to one embodiment.

Referring to FIG. 3, a view of an seat display 30 is shown, according to an exemplary embodiment. The seat display 30 includes a seat status indicator 34, and is configured to display information about a single seat location of the vehicle instead of the entire vehicle like the display 20 of FIG. 2. The information displayed by the seat display 30 is driven by information received from the status sensor of the seat belt system as well as the occupant sensing system of the seat location. In some embodiments, the information displayed is also driven by information received from the occupant boarding and de-boarding system. In yet other embodiments, the information displayed is controlled by the controller. In one embodiment, the seat status indicator 34 displays information regarding a presence of an occupant, an occupant identity, and a state of a seat belt system. The seat display 30 may be installed in various locations on the vehicle. For example, the seat display 30 may be attached to the back of the seat ahead of a seat location, allowing a occupant to view the seat display 30 straight in front of him or her. The occupant will be able to see the same information the driver of the vehicle has regarding the occupancy and restraint status of the seat location in which the occupant is sitting, and the occupant may adjust accordingly. For example, a occupant who did not buckle up properly will be able to see the lights 34 on the seat display 30 which indicate that the seating location is occupied and the seat belt is not properly engaged. Accordingly, the occupant may engage the seat belt properly, leading to safer conditions than if the occupant was unbuckled or improperly buckled.

According to an another embodiment, the seat display 30 may be installed on the ceiling of the vehicle, directly above the seat location for which the seat display 30 is displaying information. The occupant of each seat location in the vehicle may look upwards to check the current status of the seat. The location of the seat display 30 may assist the driver in enforcing seat belt rules and other rules of the vehicle. The lights 34 of the seat display 30 may be designed to be comparatively bright, allowing the driver of the vehicle to look back at the lights 34 using a rear view mirror and instantly determine the seats and/or the occupants in the seats where there are problems.

The lights 34 may be configured to match the configuration of the lights 24 of the display 20 of FIG. 2. Using that configuration, there may be only one light 34 on the seat display 30. Alternatively, the seat display 30 may have more than one light (e.g., three lights) that represent three possible states of the seat (e.g., seat belt not in use, seat belt is being worn improperly, seat belt is being worn properly).

The seat display 30 may also include a label 32. The label 32 indicates the seat position (e.g., seat 1A for a occupant sitting in row 1, seat A) the seat display 30 corresponds to. Therefore, the occupant is aware of the label 32 assigned to his or her position on the vehicle, which may assist in accounting for occupants in case of an emergency. The driver of the vehicle may be able to look back in the vehicle with a rear view mirror and visually identify seats using the label 32. The seat display 30 may also include various other information if needed in a text box 36, such as emergency information, and text messages regarding the status of the seat belt, etc.

Further, in some embodiments, each of the above described embodiments of the display 20 and the seat display 30 may be implemented using an LCD or LCDs. In alternative embodiments, some sections and functions of the display 20 and the seat display 30 may be implemented by an LCD or multiple LCDs and other sections and functions may be implemented with lights. For example, in an LCD embodiment of the display 20, the display 20 may include a display section for each of the seat locations.

In some embodiments, the occupant monitoring and restraint status system of the present disclosure also includes a controller. Referring to FIG. 7, the controller 704 processes output from the occupant boarding and de-boarding system 702, the status sensor of the seat belt system 703 of each seat location, and the occupant sensing system 701 of each seat location. The controller 704 also determines the location of occupants within a vehicle, whether an occupant is seated in a one of the plurality of seat locations, and whether a seat belt system of a one of the plurality of seat locations where an occupant is seated is properly engaged. The controller 704 further controls the display 20. In some embodiments, the occupant monitoring and restraint status system further includes a data store controlled by the controller and configured to store processed and received data.

In yet further embodiments, the controller is configured to communicate with a data logging system. An embodiment of this communication is described below in reference to FIG. 6.

Figure 6:
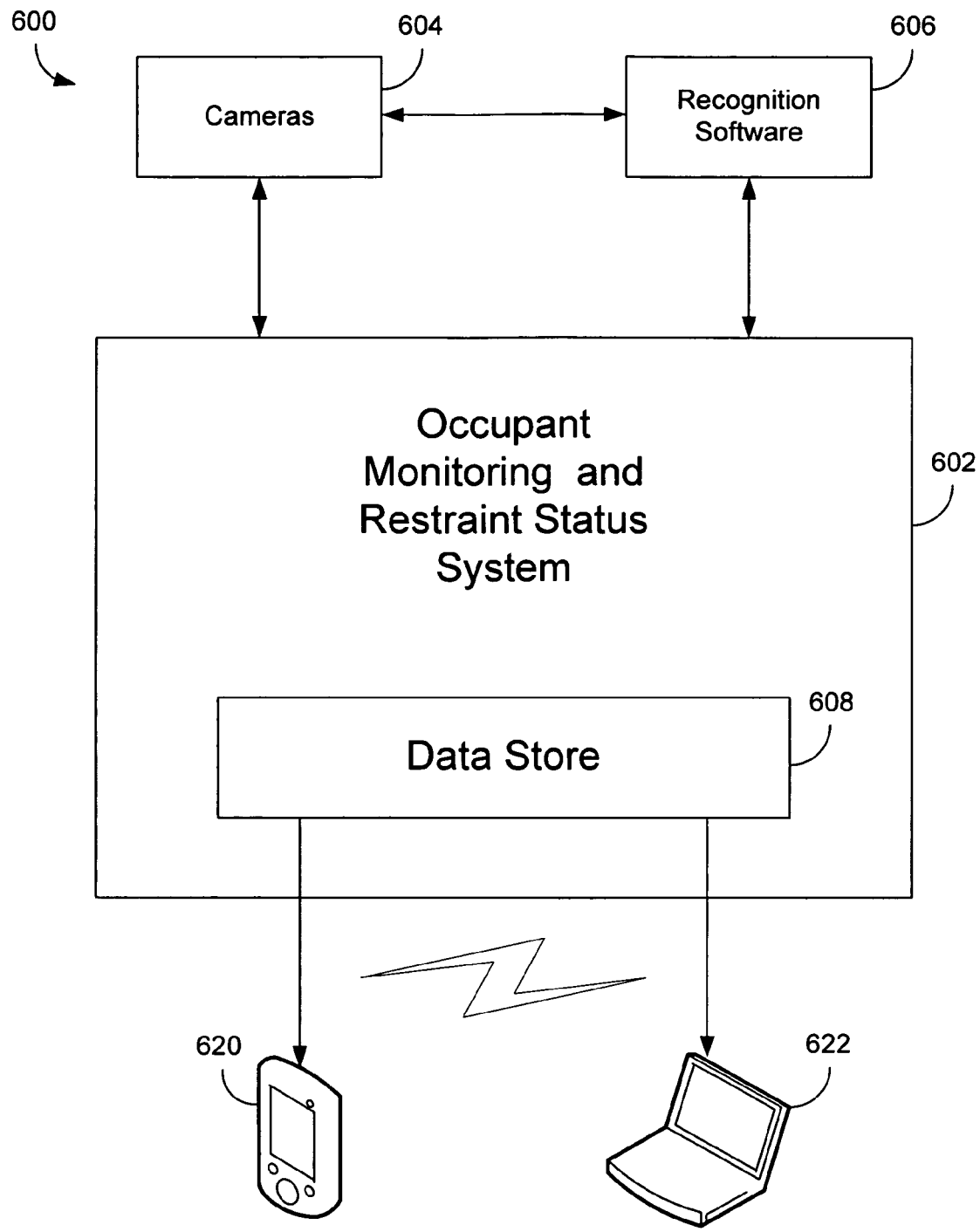
FIG. 6 is a block diagram of an occupant monitoring and restraint status system in communication with a plurality systems, according to one embodiment.

Further, some embodiments include a facial recognition system (604 and 606 of FIG. 6). In such embodiments, the facial recognition system (604 and 606 of FIG. 6) is connected to the controller and is used to aid in the identification of occupants. An embodiment of such a facial recognition system is described below in reference to FIG. 6.

Figure 4:
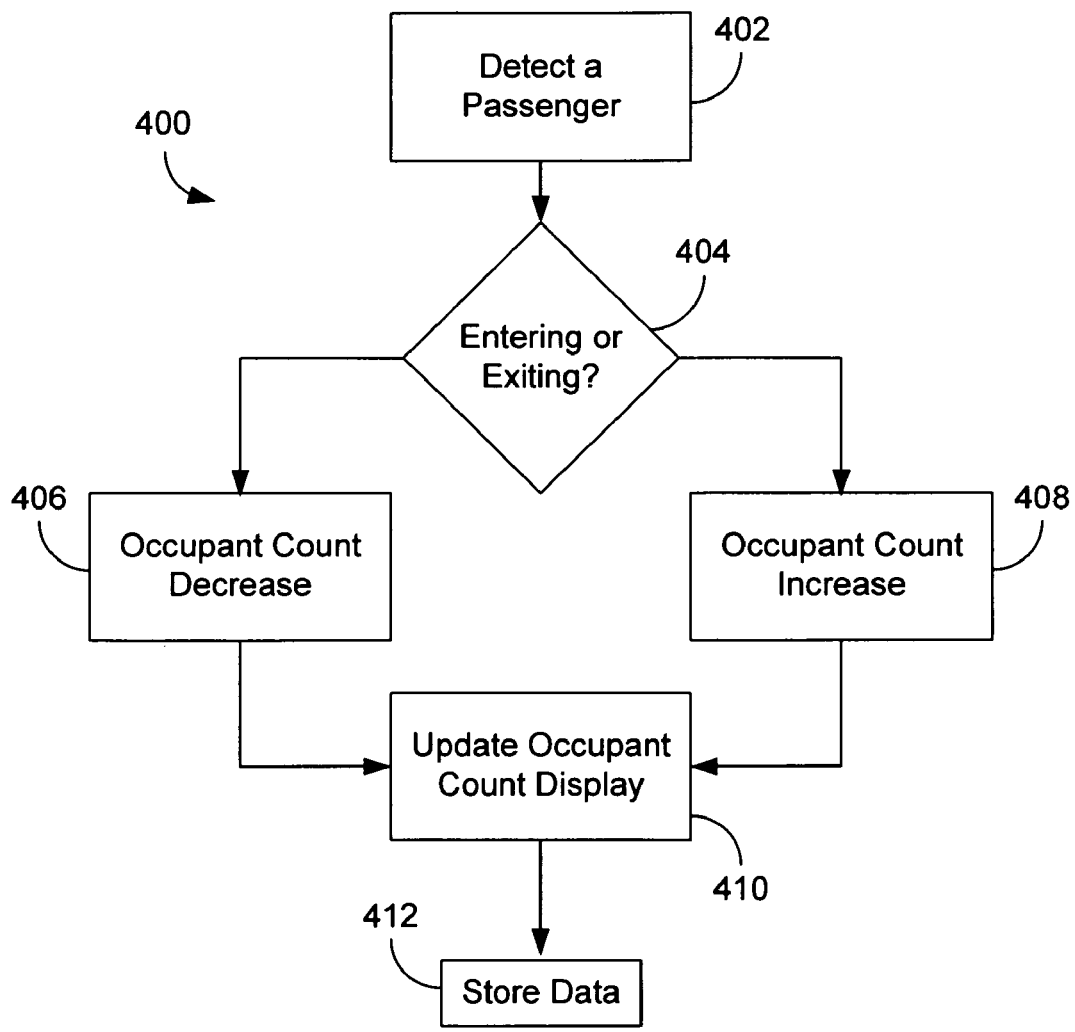
FIG. 4 is a flow diagram of an operation of an occupant boarding and de-boarding system, according to one embodiment.

Referring to FIG. 4, a flow diagram of an operation of an occupant boarding and de-boarding system is shown, according to an exemplary embodiment. The process is triggered when a occupant is detected by the occupant boarding and de-boarding system (step 402). The occupant may be detected as the occupant either enters or exits the vehicle. For example, in a bus, the occupants may be detected as they walk through the door and/or up or down the steps next to the door. In other vehicles with multiple doors, a plurality of occupant boarding and de-boarding systems may be placed at each door to detect the occupants.

The process must decide if the occupant that is detected is entering the bus or exiting the bus (step 404). Various technologies may handle this in various ways. For example, each occupant may be carrying an identification device, such as an RFID tag. An occupant boarding and de-boarding system that includes an RFID reader for detecting the identification device may be placed at or near the door of the vehicle. In some embodiments, the RFID reader may be in communication with a database which stores data regarding each identification device. For example, the RFID reader may detect an identification number (ID number) from the identification device. If the ID number was already in the database, a occupant has just exited the bus and the occupant count is decreased by one (step 406). If the ID number is not currently in the database, a new occupant is therefore detected, the database is updated, and the occupant count is increased (step 408).

Alternatively, a laser or a "tripwire" system may be used to determine if a occupant is entering or exiting. A "tripwire" system may be comprised of two "tripwires", one closer to the door of the vehicle than the other. The "tripwire" system may detect the direction in which a occupant is heading by determining which of the two "tripwires" is crossed first, and the occupant count may be adjusted accordingly (step 406 or step 408). Meaning, if the "tripwire" closest to the door of the vehicle is crossed first, than a occupant is entering the vehicle. If the "tripwire" furthest from the door of the vehicle is crossed than a occupant is exiting the vehicle. In another embodiment, a weight sensor configured to read the presence of a occupant stepping on each of the steps of the vehicle may be used to monitor boarding and de-boarding of occupants. Accordingly, a reading on a higher step above a lower step followed by a reading of the lower step may indicate the exiting of a occupant (step 406). Alternatively, a weight sensor picking up a reading on the lower step followed by a reading on the higher step above the lower step may indicate the entering of a occupant (step 408).

A occupant count display section 22 of the display 20 may automatically update when the occupant count is changed (step 410) and the data regarding the occupant count may be stored (step 412). By way of example, the data regarding the occupant count may be stored in a data store controlled by the controller. The storage of the data may be useful in emergency situations when occupants must be accounted for and to determine if all occupants of a bus got off of the bus and reached their destination. Furthermore, such an embodiment would be useful in a school bus application to verify that all children have left the bus.

Figure 5A:
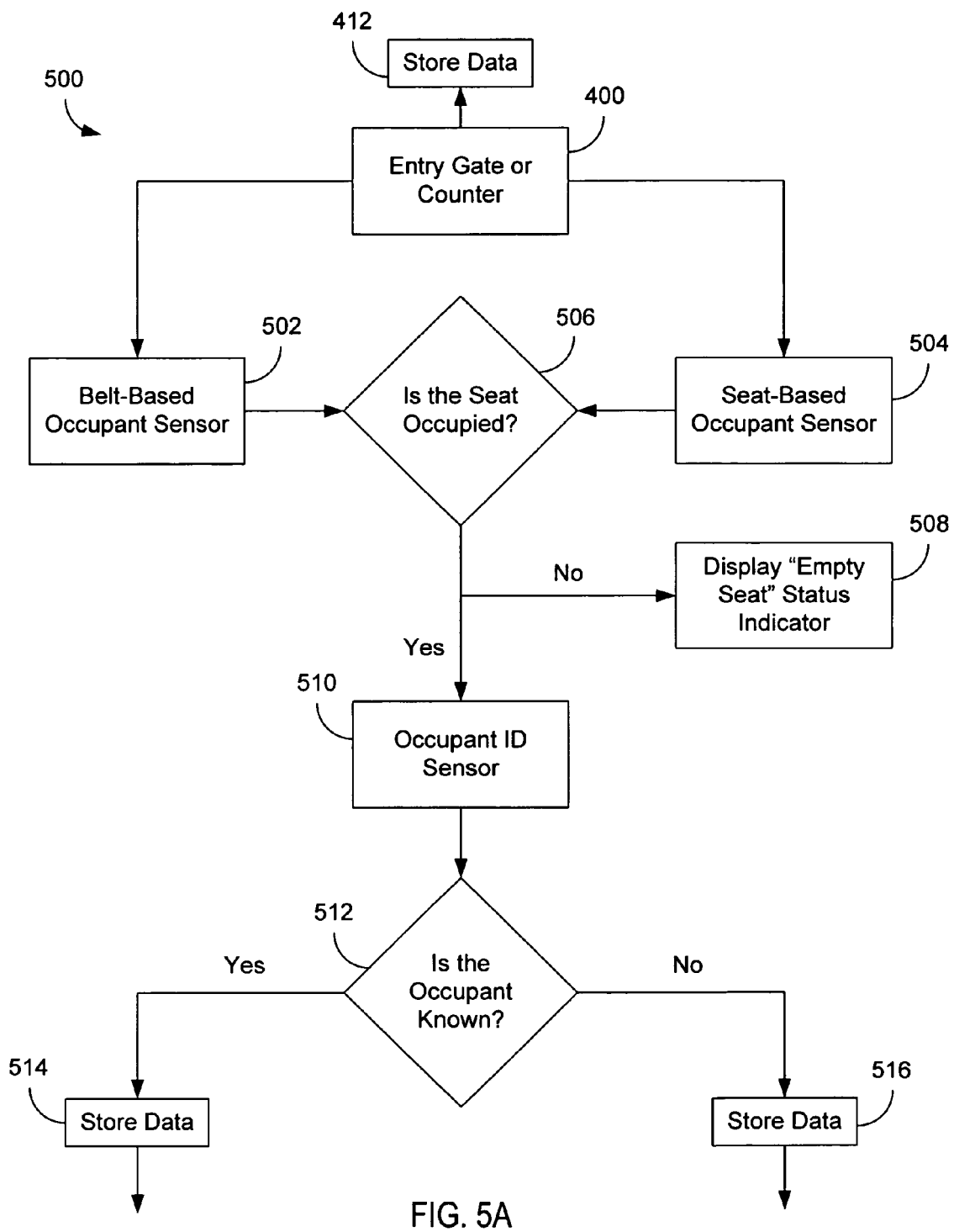
FIGS. 5A and 5B are a flow diagram of a process of updating a display of an occupant monitoring and restraint status system, according to one embodiment.
Figure 5B:
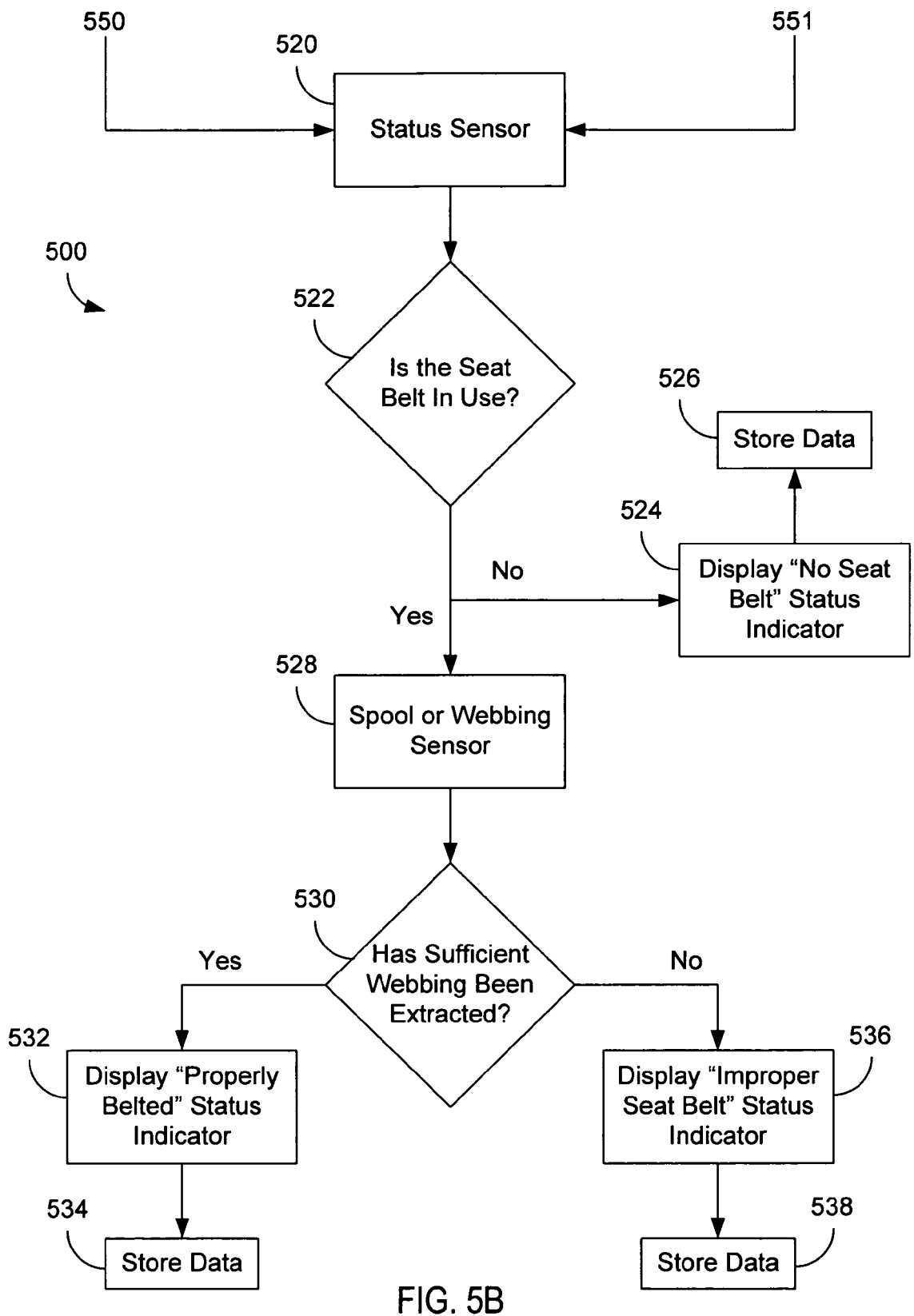

Referring to FIGS. 5A and 5B, a flow diagram 500 of a process of updating a display 20 of an occupant monitoring and restraint status system is shown, according to an exemplary embodiment. Referring to FIG. 5A, the first steps are to update the occupant count and store the appropriate data (steps 400 and 412) as described in FIG. 4. The data stored in step 412 may be used to check against later data for consistency (e.g., the number of seats occupied equaling the occupant count of the vehicle).

The next step is to detect if a seat is occupied. There are two different methods that may be used to accomplish this goal. A seat belt-based presence sensor of an occupant sensing system may be used (step 502). For example, a magnetic field monitoring system may be installed within the seat belt (or perhaps the seat itself) to determine if a occupant is present.

Likewise, a seat-based presence sensor of an occupant sensing system may be used to determine the presence of a occupant (step 504). A membrane-type pressure switch may be installed in each seat and may identify the presence of a occupant when the occupant sits on the seat. Alternatively, a strain gauge-type displacement measurement may identify the presence of a occupant when the occupant sits on the seat.

Using the belt-based occupant sensing system and/or the seat-based occupant sensing system, the system determines if the seat is occupied or not (step 506). If the seat is not occupied, an empty seat status indicator (E.G. colored-light 24 of FIG. 2) for the seat location may be displayed on the display 20 for the driver of the vehicle (step 508). If the seat is occupied, the system may choose to determine the current status of the seat belt system. Alternatively, if the driver wishes, the information display may be adjusted to simply show which seats are occupied and the system may stop at this step.

Once occupied seats are determined, an identification sensor may be used to identify the occupant in each seat (step 510). The identification sensor of the occupant sensing system may be embedded within the seat or seat belt, or may be located in any position on the vehicle. In some embodiments, the identification sensor is an RFID reader. A determination is made to whether the occupant is known or not (step 512).

If the occupant is known, the proper data may stored (step 514). For example, the proper data may be stored by a data store controlled by the controller. The data may be used to alter an identification display of the display 20 appropriately. Additionally, the stored data may become useful in other applications outside of the occupant monitoring and restraint status system. For example, occupants who do not wear seat belts or do not wear seat belts properly may be identified. The threat of vandalism may be reduced since the location of the occupants in the vehicle may be identified at any point in time. In general, especially in school buses where the occupants are generally younger, the use of identification devices may help in the monitoring of the occupants, which may eventually improve the environment in the vehicle and even reduce the cost of providing monitors in the vehicle.

If the occupant is not known, the data is stored appropriately (step 516). For example, the proper data may be stored by a data store controlled by the controller. If the occupant is not known, then the driver of the vehicle may be able to identify the "mystery" occupants and determine if the occupant should be on the vehicle or not. The driver of the vehicle may also be able to recognize a malfunctioning identification device if the device is not recognizable by the identification sensor.

Now referring to FIG. 5B, once the occupant is defined as in a seat and identifiable or not, a status sensor of the seat belt system is used to determine if the seat belt is being worn (step 520). The status sensor of the seat belt system determines if the seat belt latch plate is connected to the seat belt buckle (step 522). The detection may be made using technologies such as an identification device (e.g., RFID tag) or inductive capacitance, or the detection may be done using a traditional switch within the seat belt buckle which activates when the seat belt buckles or unbuckles.

If the seat belt is not buckled (e.g., not in use), the "no seat belt" status indicator is displayed on the display 20 (step 524) and the data may stored (step 526). For example, the proper data may be stored by a data store controlled by the controller. If the seat belt is buckled, a determination has to be made on if the seat belt is buckled properly.

A spool or webbing component of a status sensor may be used to determine if the seat belt is buckled properly (step 528). For example, spool rotation or spool thickness may be measured using various technologies. Using the measurements, a comparison may be made to the normal spool rotation and thickness when a seat belt is in use and a determination of if sufficient webbing of the seat belt has been extracted can be made (step 530).

Alternatively, an RFID sensor may be coupled to the webbing of the seat belt as a component of the status sensor. The sensor may be masked or unmasked. The sensor may be used to determine the position and other properties of the webbing, and may be able to make a determination as to if sufficient webbing has been extracted (step 530). For example, the webbing payout measurement and the buckle switch status may not agree.

If sufficient webbing was extracted, the "properly belted" status indicator is displayed on the display 20 (step 532) and the data may be stored (step 534). For example, the proper data may be stored by a data store controlled by the controller. Otherwise, the "improper seat belt" status indicator is displayed on the display 20 (step 536) and the data may stored (step 538). For example, the proper data may be stored by a data store controlled by the controller.

The data that is stored throughout the process may be used in several ways. For example, statistics regarding seat belt use may be provided based on how often occupants were not wearing seat belts or were improperly wearing seat belts. The driver of the vehicle or other personnel may use the statistics to alter safety strategies. The data may be easily sorted and recorded for administrators and other personnel. Also, at any given time, the stored data may be communicated wirelessly or with a wired connection to any device communicable with the occupant monitoring and restraint status system such as a data logging system.

As another example, the occupant monitoring and restraint status system may record the status of seat occupancy and seat belt usage throughout a trip, determining changes along the way. In one embodiment, the controller records the status of seat occupancy and seat belt usage throughout a trip, tracking changes along the way. Occupants who change seats or change "status" throughout the trip may be identified (e.g., changing seats while the vehicle is in motion). Additionally, statistics regarding individual occupants may be recorded such that authority figures may discipline occupants accordingly (e.g., for not wearing his or her seat belt). The use of the data provides time savings (e.g., seat belt usage does not have to be recorded by hand) and in other special cases. For example, in an accident, the data may show that an injured occupant was not properly buckled.

Referring to FIG. 6, a block diagram 600 of the occupant monitoring and restraint status system 602 in communications with a plurality systems, according to an exemplary embodiment. The occupancy and restraint status system 602 includes a data store 608 which collects all the data compiled about occupancy and seat belt usage.

The occupant monitoring and restraint status system 602 may be coupled to other systems, applications, and software that may be used in conjunction with the occupant monitoring and restraint status system 602. For example, various cameras 604 located inside the vehicle may be used to identify an occupant. The cameras 604 may receive data from the occupant monitoring and restraint status system regarding a occupant who is not in a seat or a occupant who does not have a seat belt on. The cameras 604 may then "focus" on the occupant and record what the occupant does. If the occupant is delinquent, the cameras 604 may be useful to discipline the occupant.

Further, the cameras 604 may also help identify occupants who were not identified by an occupant sensing system. The cameras 604 in combination with recognition software 606 may be a facial recognition system configured to identify an occupant of the vehicle based on images of the occupant's face. The facial recognition system may be connected to the controller. Recognition software 606, such as a facial recognition software, may be used in conjunction with the cameras 604. If a occupant can not be identified by an occupant sensing system, recognition software 606 with image information received from a camera 604 may be used. Recognition software 606 may also be useful in cases where a occupant is using an identification device that is not his or hers. Cameras 604 and recognition software 606 also play a role in curbing potential vandalism or other general troublemaking from occupants, especially children in a school bus.

The data in the data store 608 may be provided to various applications, either within or outside of the vehicle. An administrator, driver of the vehicle, or other supervisory figure may have access to the data store 608. The data in data store 608 may be formatted into various formats for various software. For example, a report may be created and transmitted to a Personal Digital Assistant (PDA) 620, a laptop 622, or any other device. The data may be transmitted using a wired connection (e.g., a standardized physical communication port such as a universal serial bus (USB) connection) or wirelessly over a local area network (LAN) type network.

It is important to note that the construction and arrangement of the occupant monitoring and restraint status system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. An occupant monitoring and restraint status system for a vehicle, comprising:
   an occupant boarding and de-boarding system configured to detect boarding and de-boarding of occupants;
   a bench type seat including a plurality of seat locations, wherein each seat location includes a seat belt system including a status sensor, and each seat location includes an occupant sensing system,
   wherein the status sensor of a seat belt system is configured to detect a state of the seat belt system, and
   wherein the occupant sensing system is configured to detect a presence of an occupant and to detect an identity of an occupant;
   a display including a seat status indicator for each of the plurality of seat locations, wherein the seat status indicator includes information regarding the presence of an occupant, the occupant identity, and the state of the seat belt system.

2. The occupant monitoring and restraint status system of claim 1, wherein the display is an LCD.

3. The occupant monitoring and restraint status system of claim 1, further comprising:
   a plurality of seat displays corresponding to each seat location, wherein each seat display includes a seat status indicator that includes information regarding a presence of an occupant, an occupant identity, and a state of a seat belt system.

4. The occupant monitoring and restraint status system of claim 1, further comprising:
   a camera to record occupants of the vehicle.

5. The occupant monitoring and restraint status system of claim 1, wherein the display further displays information regarding a number of occupants detected by the occupant boarding and de-boarding system.

6. The occupant monitoring and restraint status system of claim 1, wherein the occupant boarding and de-boarding system comprises a first tripwire and a second tripwire closest to a door of the vehicle.

7. The occupant monitoring and restraint status system of claim 1, wherein the occupant boarding and de-boarding system comprises a weight sensor of a higher step and a weight sensor of a lower step.

8. The occupant monitoring and restraint status system of claim 1, wherein the occupant boarding and de-boarding system comprises a radio frequency identification reader.

9. The occupant monitoring and restraint status system of claim 1, wherein the status sensor of the seat belt system includes a seat belt webbing payout sensor.

10. The occupant monitoring and restraint status system of claim 1, wherein the status sensor of the seat belt system includes an inductive capacitance sensor.

11. The occupant monitoring and restraint status system of claim 1, wherein the status sensor of the seat belt system includes a radio frequency identification sensor.

12. The occupant monitoring and restraint status system of claim 1, wherein the occupant sensing system includes a presence sensor within the bench type seat that is a membrane-type pressure switch.

13. The occupant monitoring and restraint status system of claim 1, wherein the occupant sensing system includes a presence sensor within the bench type seat that is a strain gauge-type displacement measurement sensor.

14. The occupant monitoring and restraint status system of claim 1, wherein the occupant sensing system includes a presence sensor that is a magnetic field sensor.

15. The occupant monitoring and restraint status system of claim 1, wherein the occupant sensing system includes an identification sensor that is a radio frequency identification reader.

16. An occupant monitoring and restraint status system, comprising:
   an occupant boarding and de-boarding system configured to detect boarding and de-boarding of occupants;
   a bench type seat including a plurality of seat locations, wherein each seat location includes a seat belt system including a status sensor, and each seat location includes an occupant sensing system,
   wherein the status sensor of a seat belt system is configured to detect a state of the seat belt system, and
   wherein the occupant sensing system is configured to detect a presence of an occupant and to detect an identity of an occupant;
   a display including a seat status indicator for each of the plurality of seat locations, wherein the seat status indicator includes information regarding the presence of an occupant, the occupant identity, and the state of the seat belt system; and
   a controller configured to process output from the occupant boarding and de-boarding system, the status sensor of the seat belt system of each seat location, and the occupant sensing system of each seat location, and to determine a location of an occupant within a vehicle, whether an occupant is seated in a one of the plurality of seat locations, and whether a seat belt system of a one of the plurality of seat locations where an occupant is seated is properly engaged, and to control the display.

17. The occupant monitoring and restraint status system of claim 16, wherein the controller is configured to communicate with a data logging system.

18. The occupant monitoring and restraint status system of claim 16, wherein the controller is further configured to determine whether an occupant has moved seat locations during operation of the vehicle.

19. The occupant monitoring and restraint status system of claim 16, further comprising:
   a data store, wherein the controller controls the data store and stores processed and received data.

20. The occupant monitoring and restraint status system of claim 16, further comprising:
   a facial recognition system connected to the controller and configured to identify an occupant of the vehicle based on images of the occupant's face.

* * * * *